(12) United States Patent  
Mueller

(10) Patent No.: US 8,720,260 B2  
(45) Date of Patent: May 13, 2014

(54) CHECKING DEVICE FOR CHECKING AUTOMOTIVE SUSPENSION SYSTEM

(76) Inventor: Michael Mueller, Bad Staffelsdein (DE)

(*) Notice: Subject to any disclaimer, the term of this patent is extended or adjusted under 35 U.S.C. 154(b) by 254 days.

(21) Appl. No.: 13/284,952

(22) Filed: Oct. 30, 2011

(65) Prior Publication Data

US 2013/0104639 A1  May 2, 2013

(51) Int. Cl.
*G01M 17/04* (2006.01)

(52) U.S. Cl.
USPC .................................. 73/115.07; 73/117.03

(58) Field of Classification Search
USPC ............... 73/115.01, 115.07, 117.01, 117.02, 73/117.03
See application file for complete search history.

(56) References Cited

U.S. PATENT DOCUMENTS

| | | | |
|---|---|---|---|
| 3,736,665 A * | 6/1973 | La Moreux | 33/203 |
| 3,964,303 A * | 6/1976 | Vexelman et al. | 73/146 |
| 3,987,659 A * | 10/1976 | McKenney et al. | 73/11.07 |
| 4,774,829 A * | 10/1988 | Westall | 73/11.08 |
| 4,986,119 A * | 1/1991 | Gicewicz | 73/146 |
| 2003/0041666 A1* | 3/2003 | Parker | 73/462 |
| 2004/0020313 A1* | 2/2004 | Rossato | 73/865.9 |
| 2010/0140574 A1* | 6/2010 | Sim | 254/129 |

* cited by examiner

*Primary Examiner* — Eric S McCall

(57) ABSTRACT

A checking device for checking automotive suspension system comprises a rod and a work piece fixed on the rod. The work piece includes a work surface for pressing against a tread portion of the wheel. Rotating the rod can make the wheel and the suspension system connected thereto sway in a direction different from the forward rotating direction of the wheel. Then the user can find out the faults by the abnormal sound made by the respective components of the suspension system, so that the checking device for checking automotive suspension system is capable of reducing the time for finding out the faults in the suspension system.

7 Claims, 7 Drawing Sheets

CHECKING DEVICE FOR CHECKING AUTOMOTIVE SUSPENSION SYSTEM

BACKGROUND OF THE INVENTION

1. Field of the Invention

The present invention relates to a checking tool, and more particularly to a checking device for checking automotive suspension system.

2. Description of the Prior Art

Referring to FIG. 1, automotive suspension system 11 is generally disposed between the chassis and the wheels and comprises a front drive shaft 111 for rotating the wheel 12, a leg 112 connected to the wheel 12, a suspension arm 113 and a shock absorber 114 connected to the leg 112.

In addition to absorbing the vibration and shock produced when a car is moving, the suspension system 11 also serves to transmit the driving force or breaking force to the chassis and therefore has a direct influence on the ride comfort, driving safety and control. Hence, when a car is serviced, the suspension system 11 is one of items that must be checked. However, the current method for checking the suspension system 11 has to rely on visual check which requires experience, and visual check is unable to find out the interior condition of the respective components inside the suspension system 11.

The present invention has arisen to mitigate and/or obviate the afore-described disadvantages.

SUMMARY OF THE INVENTION

The primary object of the present invention is to provide a checking device for checking automotive suspension system which is capable of reducing the time for finding out the faults in the suspension system.

To achieve the above object, the checking device for checking automotive suspension system comprises a rod and a work piece. The rod includes an axis in the same direction as a forward rotating direction of the wheel, a rotating portion extending in a direction of the axis, and an operating portion connected to the rotating portion. The operating portion drives the rotating portion to rotate around the axis. The work piece is fixed on the rotating portion and includes a work surface for pressing against a tread portion of the wheel.

Preferably, the work piece is integral with the rotating portion of the rod.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
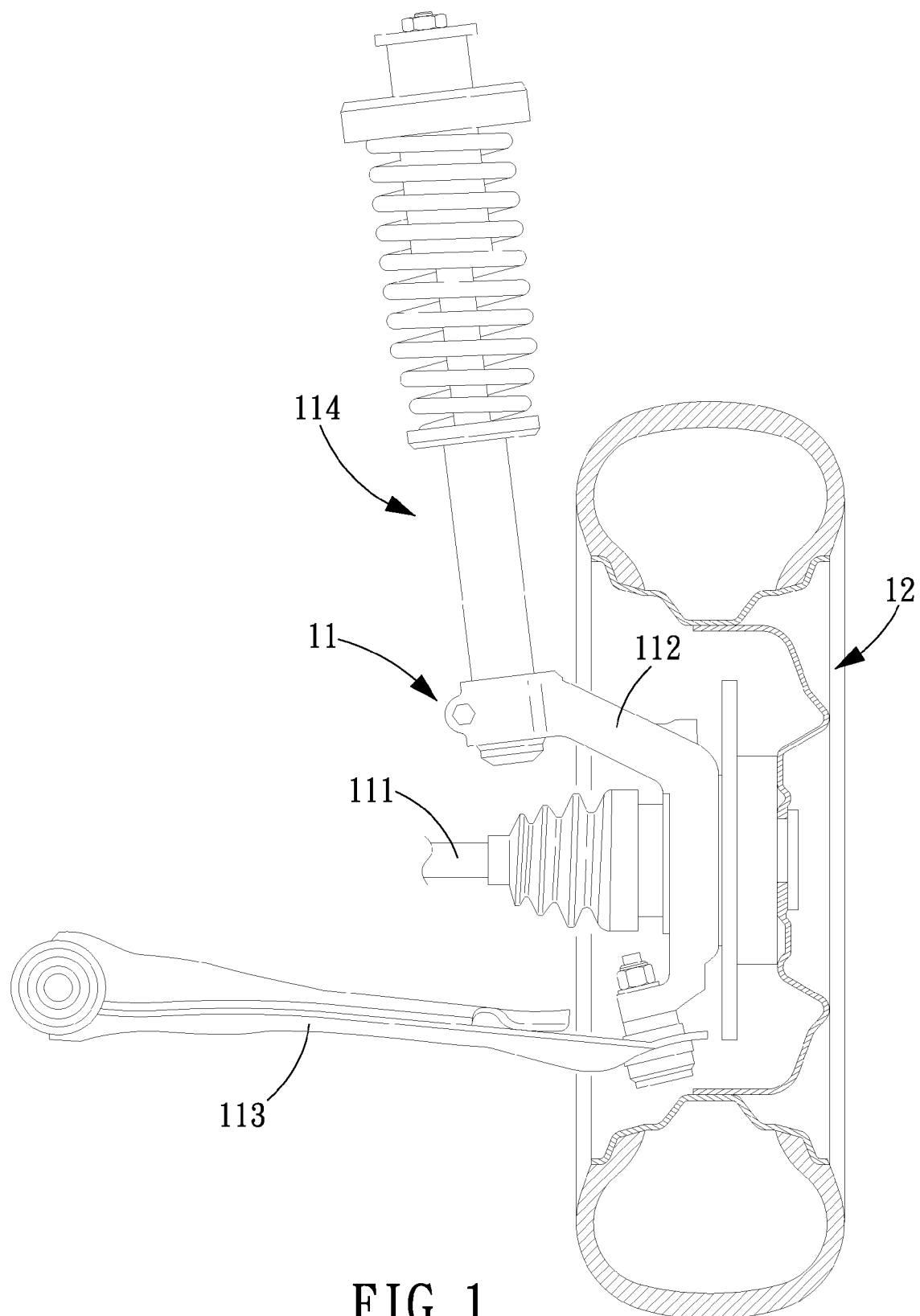
FIG. 1 shows a conventional automotive suspension system.
Figure 2:
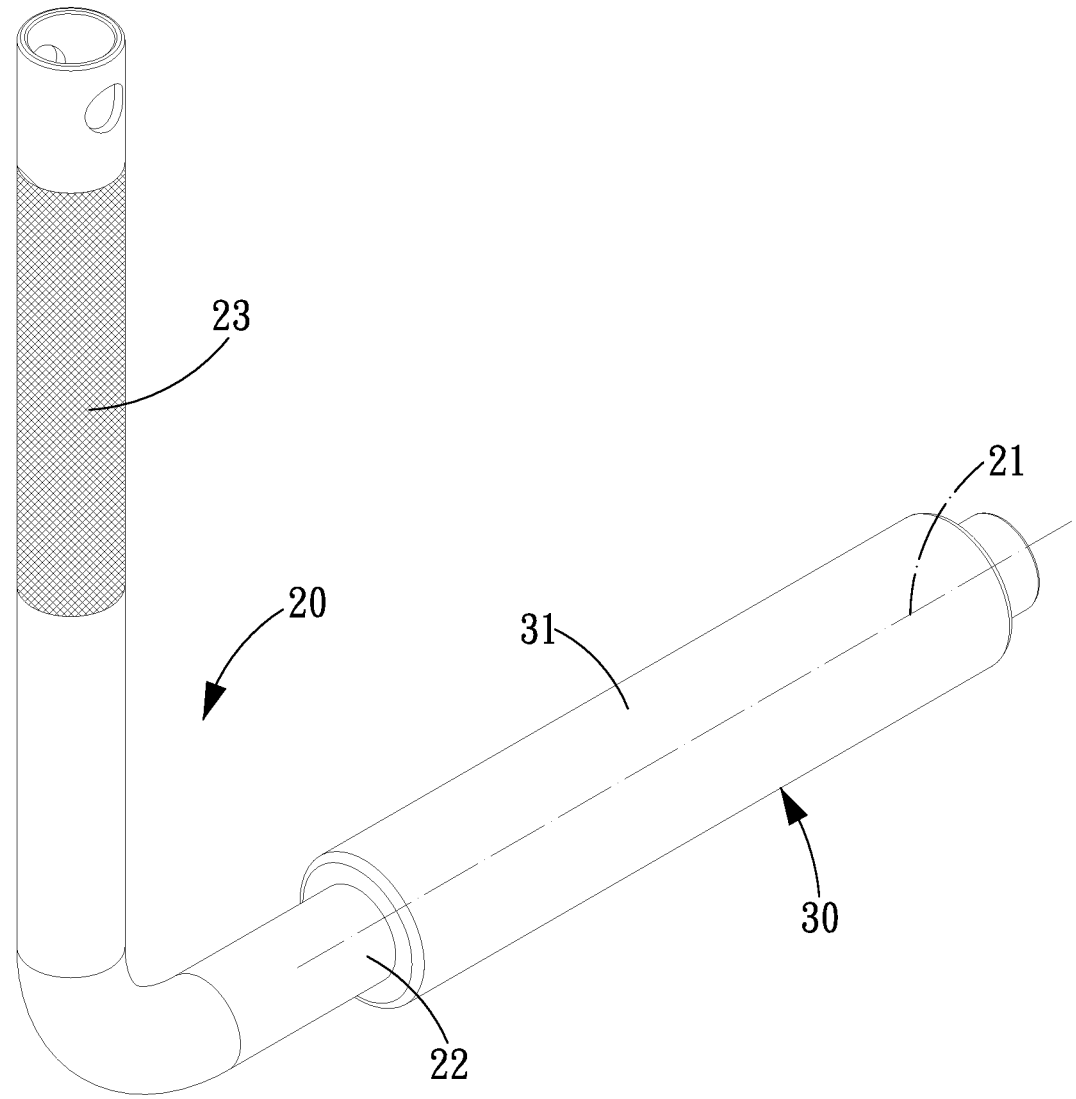
FIG. 2 is a perspective view of a checking device for checking automotive suspension system in accordance with the present invention.
Figure 3:
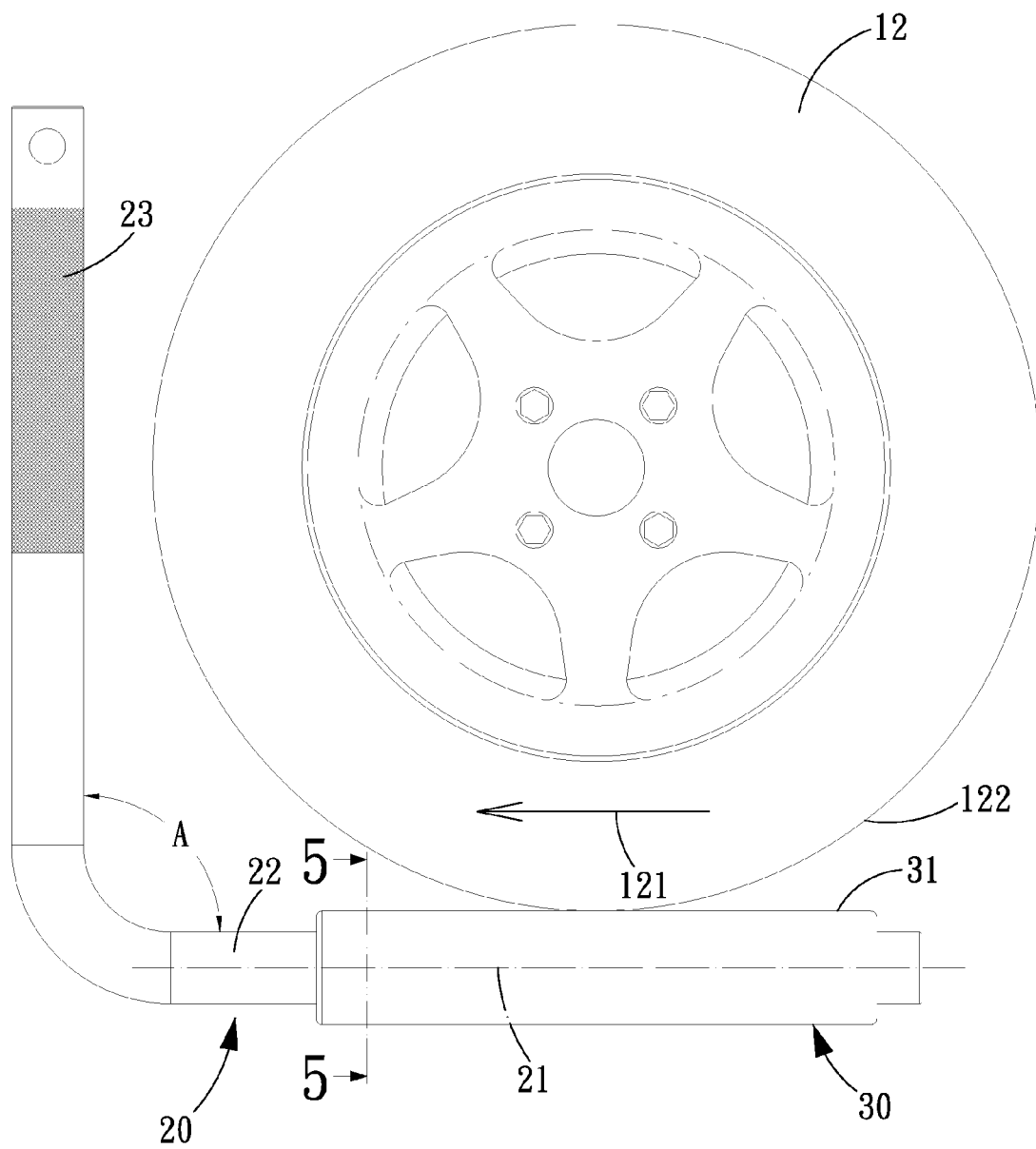
FIG. 3 is a side view showing that the checking device is pressed against the tread portion of a tire.

Referring to FIGS. 2 and 3, a checking device for checking automotive suspension system in accordance with the present invention is applicable to the wheel 12 which is provided with suspension system 11. The suspension system 11 is as shown in FIG. 1 and comprises the front drive shaft 111 for rotating the wheel 12, the leg 112 connected to the wheel 12, the suspension arm 113 and the shock absorber 114. Since the suspension system 11 is of conventional structure, and further description is omitted here. The checking device comprises a rod 20 and a work piece 30.

Figure 5:
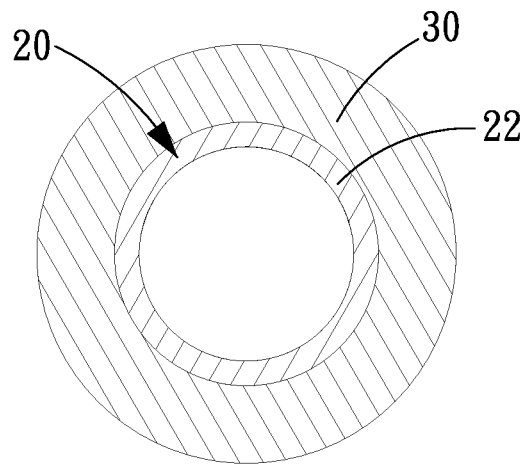
FIG. 5 is a cross sectional view taken along the line 5-5 of FIG. 3, showing that the rod is hollow and circular, and the work piece is ring-shaped and has a circular cross section.

The rod 20 includes an axis 21 in the same direction as the forward rotating direction 121 of the wheel 12, a rotating portion 22 extending in the direction of the axis 21, and an operating portion 23 connected to the rotating portion 22. The operating portion 23 is formed with anti-skid structure and drives the rotating portion 22 to rotate around the axis 21. In this embodiment, the rod 20 is a hollow pipe and circular in cross section, therefore, the rotating portion 22 is a hollow circular structure (as shown in FIG. 5). In addition, the rotating portion 22 of the rod 20 defines an angle A with respect to the operating portion 23, and the angle A is 90 degrees.

The work piece 30 is ring-shaped (as shown in FIG. 5) and fixed on the rotating portion 22 and includes a work surface 31 for pressing against the tread portion 122 of the tire on the wheel 12.

Figure 4:
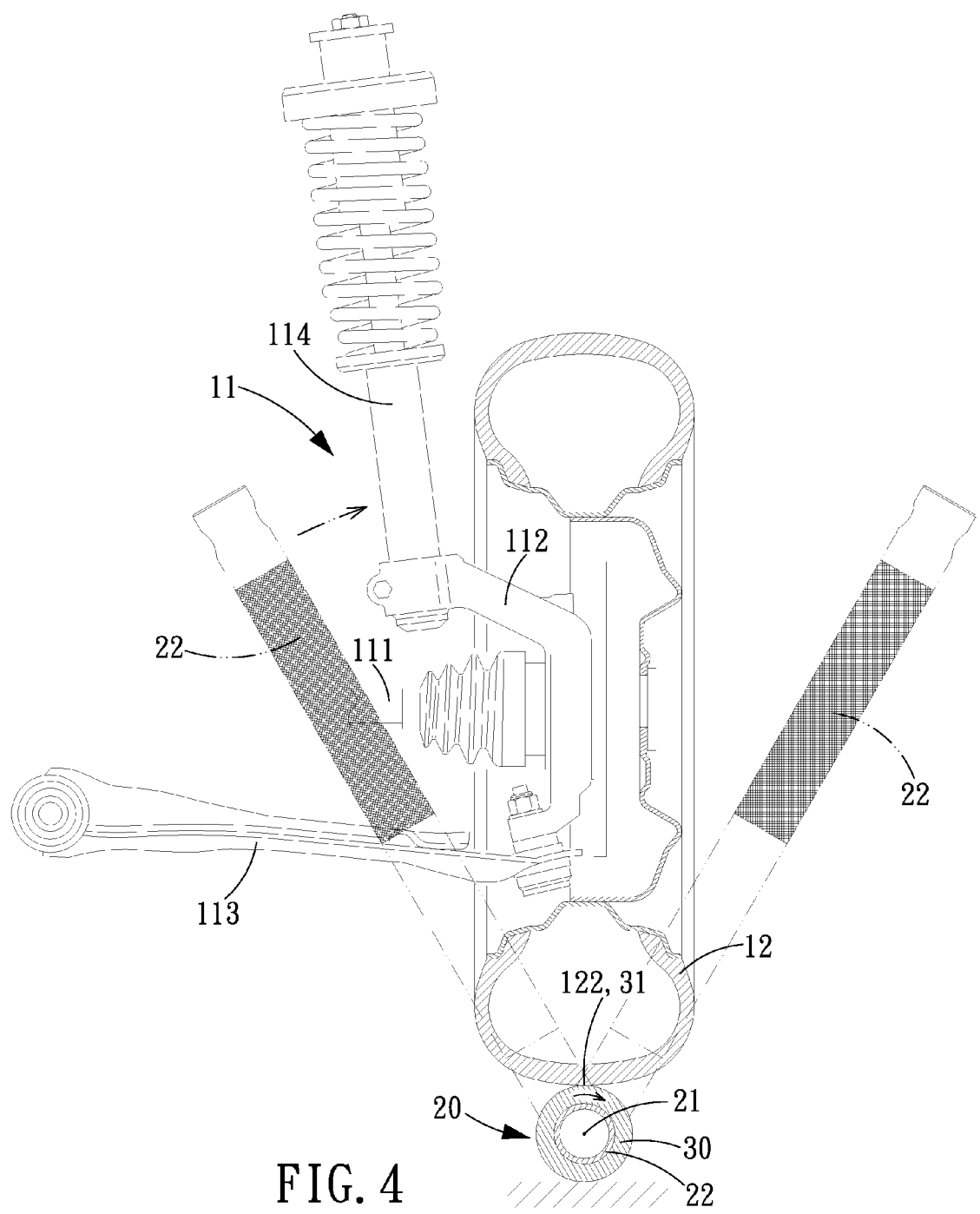
FIG. 4 is an operational view of the checking device for checking automotive suspension system in accordance with the present invention.

Referring then to FIGS. 3 and 4, when the tread portion 122 of the wheel 12 is pressed against the work surface 31 of the work piece 30 in such a manner that the forward rotating direction 121 of the wheel 12 is parallel to the axis 21 of the rod 20, the user can rotate the work piece 30 an angle around the axis 21 by pulling the operating portion 23 of the rod 20, so as to make the wheel 12 and the suspension system 11 connected thereto sway in a direction different from the forward rotating direction 121 of the wheel 12. Then the user can find out the faults by the abnormal sound made by the respective components of the suspension system 11.

It is to be noted that the respective components of the suspension system 11 are mostly jointed in the running direction of the vehicle, while the direction that the work piece 30 is rotated by the rod 20 is different from the direction that the respective components of the suspension system 11 are jointed, therefore, the faults of the suspension system 11 can be found out.

Figure 6:
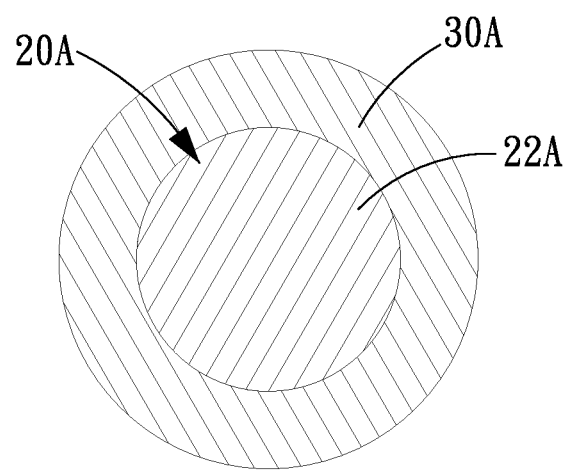
FIG. 6 is a cross sectional view taken along the line 5-5 of FIG. 3, showing that the rod is a solid rod and has a circular cross section, and the work piece is circular in cross section.
Figure 7:
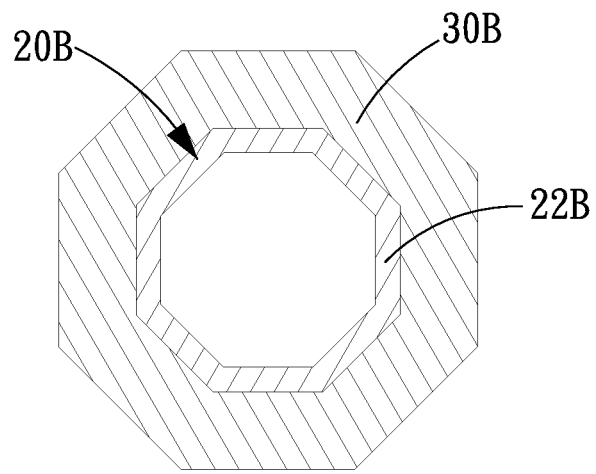
FIG. 7 is a cross sectional view taken along the line 5-5 of FIG. 3, showing that the rod is a hollow pipe and has an octagonal cross section, and the work piece also has an octagonal cross section.
Figure 8:
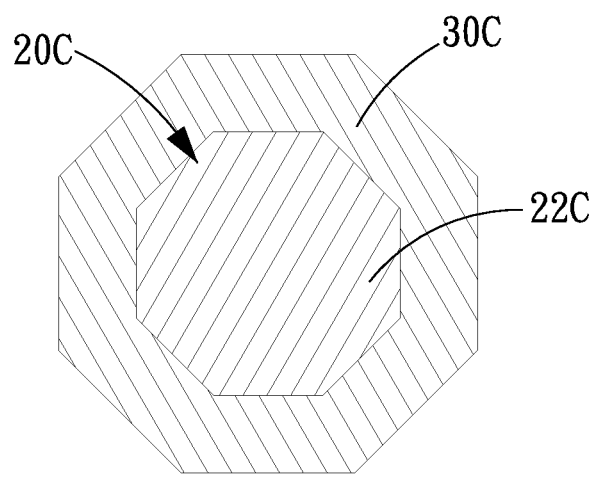
FIG. 8 is a cross sectional view taken along the line 5-5 of FIG. 3, showing that the rod is a solid rod and has an octagonal cross section, and the work piece also has an octagonal cross section.

Moreover, the rod 20 and the work piece 30 can also have other embodiments. For example, as shown in FIG. 6, the rod 20A is a solid rod with circular cross section, and therefore the rotating portion 22A is also circular and solid. The work piece 30A is ring-shaped and has a circular cross section. As shown in FIG. 7, the rod 20B is a hollow pipe with an octagonal cross section and its rotating portion 22B is hollow and octagonal in cross section, and the work piece 30B is ring-shaped and has an octagonal cross section. As shown in FIG. 8, the rod 20C is a solid rod with an octagonal cross section, its rotating portion 22C is also solid and has an octagonal cross section, and the work piece 30C is ring-shaped and has an octagonal cross section.

Figure 9:
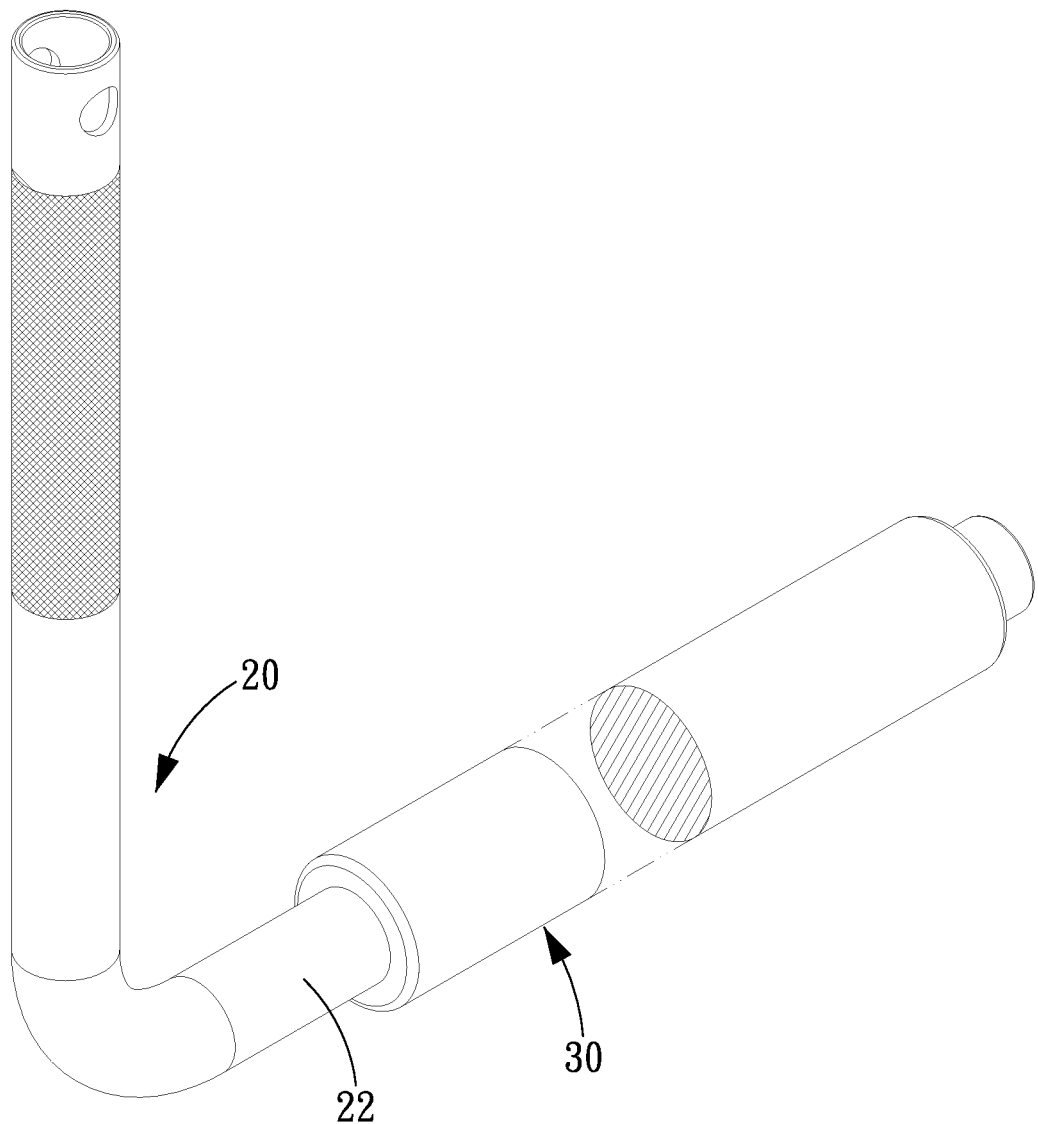
FIG. 9 shows another embodiment of a checking device for checking automotive suspension system in accordance with the present invention, wherein the work piece is integral with the rod.

Finally, the work piece 30 and the rod 20 can be integrally formed as a unitary structure, as shown in FIG. 9, the work piece 30 is integrally formed on the rotating portion 22 of the rod 20.

While we have shown and described various embodiments in accordance with the present invention, it is clear to those skilled in the art that further embodiments may be made without departing from the scope of the present invention.

What is claimed is:

1. A checking device for checking automotive suspension system being applicable to a wheel provided with suspension system, the checking device comprising:
    a rod including an axis in the same direction as a forward rotating direction of the wheel, a rotating portion extending in a direction of the axis, and an operating portion connected to the rotating portion, the operating portion driving the rotating portion to rotate around the axis; and
    a work piece fixed on the rotating portion and including a work surface for pressing against a tread portion of the wheel;
    the checking device being characterized in that an angle is defined between the rotating portion of the rod and the operating portion, pulling the operating portion of the rod can rotate the work piece around the axis, consequently making the wheel and the suspension system connected the wheel sway in a direction different from the forward rotating direction of the wheel.

2. The checking device for checking automotive suspension system as claimed in claim 1, wherein the rod is a hollow pipe and has a circular cross section, and the work piece is circular in cross section.

3. The checking device for checking automotive suspension system as claimed in claim 1, wherein the rod is a solid rod and has a circular cross section, and the work piece is circular in cross section.

4. The checking device for checking automotive suspension system as claimed in claim 1, wherein the rod is a hollow pipe and has an octagonal cross section, and the work piece also has an octagonal cross section.

5. The checking device for checking automotive suspension system as claimed in claim 1, wherein the rod is a solid rod and has an octagonal cross section, and the work piece also has an octagonal cross section.

6. The checking device for checking automotive suspension system as claimed in claim 1, wherein the angle is 90 degrees.

7. The checking device for checking automotive suspension system as claimed in claim 1, wherein the work piece is integral with the rotating portion of the rod.

* * * * *